G. W. FLUKE.
Cans for Cooling Milk During Transportation.
No. 148,114. Patented March 3, 1874.
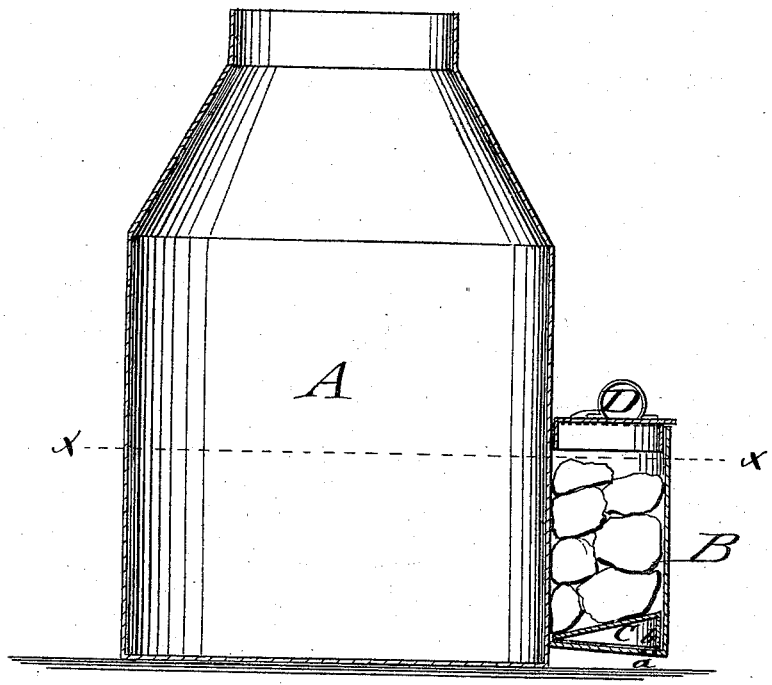
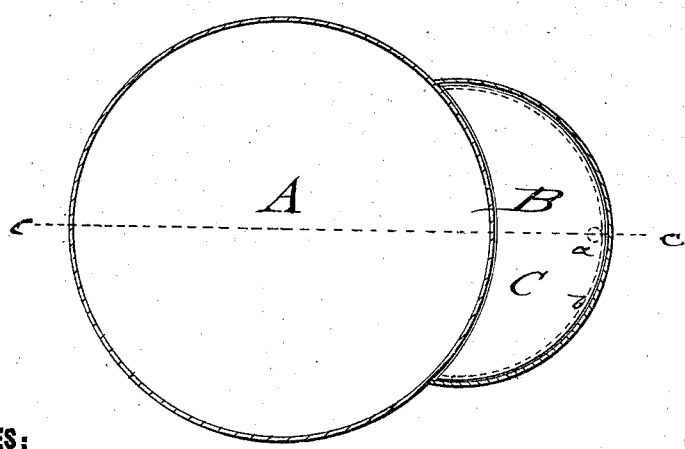

UNITED STATES PATENT OFFICE.

GEORGE W. FLUKE, OF MOUNT PLEASANT, IOWA.

IMPROVEMENT IN CANS FOR COOLING MILK DURING TRANSPORTATION.

Specification forming part of Letters Patent No. 148,114, dated March 3, 1874; application filed December 13, 1873.

*To all whom it may concern:*

Be it known that I, GEORGE W. FLUKE, of Mount Pleasant, in the county of Henry and State of Iowa, have invented a new and Improved Milk-Can, of which the following is a specification:

In the accompanying drawing, Figure 1 represents a vertical central section through my improved milk-can provided with ice-chest on the line c c, Fig. 2; and Fig. 2, a horizontal section of the same on the line x x, Fig. 1.

Similar letters of reference indicate corresponding parts.

My invention relates to improvements in milk-can by which the milk can be kept cool during its delivery even in the hottest days of the summer season, retaining its flavor without undergoing a change on account of the movements of the wagon in which the cans are carried. The invention consists in connecting with a milk-can an ice-vessel of peculiar construction, as hereinafter described and claimed. An inclined false bottom of the ice-receptacle serves to carry the ice toward the wall of the milk-can, while the ice-water is drawn off through a perforation in the bottom.

In the drawing, A represents a milk-can, of suitable size and material, of the approved construction, used by dairymen for delivering the milk to their customers. A segmental ice receptacle or chest, B, is soldered, riveted, or otherwise applied to the side of the can A, extending around the same to about one-fourth its circumference. Its bottom is inclined to the outside for collecting the melted water, and provided with a perforation, a, through which the water passes out, either by means of a connecting-pipe or otherwise. A false movable bottom, C, is placed into ice-receptacle B, and forms, by a vertical segmental flange, a suitable downward inclination toward the wall of the milk-can. The lumps of ice which are put into receptacle C are thereby continually carried toward the wall of the can, and produce an uninterrupted contact with the same, and thus the cooling off of the milk therein. A tightly-fitting cover, D, closes the ice-receptacle B, so that the ice melts slowly, especially when the ice-water is allowed to flow off. If the bottom perforation is closed, the water collects and rises in the chest, cooling the milk quicker and keeping it cooled, but requiring a greater quantity of ice.

The milk may, by the use of such cans, be furnished during the hottest day of the summer season in as cool and fresh a state as in the winter, and churning prevented. After the ice is put in it requires no further attention, and remains always in good working order.

Having thus described my invention, I claim as new and desire to secure by Letters Patent—

The combination, with milk-can A, of a vessel, D B, having the true bottom inclined outwardly and perforated at a, and having a false bottom, C, inclined inwardly, as and for the purpose described.

GEORGE W. FLUKE.

Witnesses:
 T. PACKARD,
 C. H. RUSK.